US012319050B2

(12) United States Patent
Badreddine

(10) Patent No.: US 12,319,050 B2
(45) Date of Patent: Jun. 3, 2025

(54) CONVERTING MACHINE

(71) Applicant: BOBST LYON, Bron (FR)

(72) Inventor: Abdelmalik Badreddine, Décines (FR)

(73) Assignee: BOBST LYON, Bron (FR)

( * ) Notice: Subject to any disclaimer, the term of this patent is extended or adjusted under 35 U.S.C. 154(b) by 0 days.

(21) Appl. No.: 18/684,057

(22) PCT Filed: Aug. 22, 2022

(86) PCT No.: PCT/EP2022/073346
§ 371 (c)(1),
(2) Date: Feb. 15, 2024

(87) PCT Pub. No.: WO2023/025730
PCT Pub. Date: Mar. 2, 2023

(65) Prior Publication Data

US 2024/0217229 A1 Jul. 4, 2024

(30) Foreign Application Priority Data

Aug. 23, 2021 (EP) .................................... 21315141

(51) Int. Cl.
*B41F 33/00* (2006.01)
*B41F 19/00* (2006.01)
*B41F 21/00* (2006.01)

(52) U.S. Cl.
CPC ........ *B41F 33/0081* (2013.01); *B41F 19/008* (2013.01); *B41F 21/00* (2013.01); *B41P 2200/12* (2013.01)

(58) Field of Classification Search
CPC .... B41F 33/0081; B41F 19/008; B41F 21/00; B41P 2200/12
See application file for complete search history.

(56) References Cited

U.S. PATENT DOCUMENTS

| | | | | |
|---|---|---|---|---|
| 5,606,913 | A | 3/1997 | Kowalewski | |
| 2005/0044896 | A1* | 3/2005 | Frank | C03B 23/0302 65/273 |
| 2014/0251170 | A1 | 9/2014 | Chiari et al. | |

FOREIGN PATENT DOCUMENTS

| | | | |
|---|---|---|---|
| EP | 0521158 | A1 | 1/1993 |

* cited by examiner

*Primary Examiner* — David H Banh
(74) *Attorney, Agent, or Firm* — Bookoff McAndrews LLC

(57) ABSTRACT

The invention relates to a method of aligning a plurality of printed motifs on a sheet (3) in a converting machine (10). An actual position (Pa_1) at a first sensor is defined as an initial reference position (P_ref1) for the sheet, and at least one displacement error (Δd2) is calculated and compared to a first threshold (T1). If the displacement error is lower than the first threshold, then the angular position (α) of a printing cylinder (42) in the second flexographic printing unit (16*b*) is adjusted. However, if the error is higher than the first threshold, then at least part of the of the displacement error (Δd_2) is corrected by modifying the speed (V) of a vacuum transfer unit located between the first printing unit and the second printing unit.

13 Claims, 8 Drawing Sheets

CONVERTING MACHINE

CROSS-REFERENCE TO RELATED APPLICATION(S)

This application is a National Stage Application under 35 U.S.C. § 371 of International Application No. PCT/EP2022/073346, filed on Aug. 22, 2022, which claims priority to European Application No. 21315141.8, filed on Aug. 23, 2021, the entireties of which are incorporated herein by reference.

FIELD OF THE INVENTION

The present invention relates to converting machines such as rotary die-cutter machines or folder-gluer machines which are suitable for producing flat-packed boxes or folding boxes.

BACKGROUND OF THE INVENTION

Converting machines in the form of rotary die-cutting machines can be fed by sheets which are printed in printing units, and then cut and scored to form flat-packed boxes. The flat-packed boxes are designed to be subsequently folded either manually, or automatically in a folder-gluer machine. Converting machines configured as flexo-folder gluers are similar to rotary die-cutting machines, but additionally comprise folding and gluing modules which automatically glue and fold blanks to form folding boxes.

The finished boxes often need to be provided with a printed motif or pattern. In order to provide a high and consistent quality, it is important that each sheet is correctly positioned in the printing units in relation to the angular position of the printing plates on printing cylinders. However, due to variations in the sheet transportation, some sheets arrive too early or too late to the printing cylinder. This causes a problem with misaligned colors.

To avoid printing misalignments, existing register control systems are often used and work by controlling the transportation of the sheet so that the position of the sheet can be adjusted before it arrives to the printing cylinder. Hence, if needed, the sheet is either advanced or retarded before the arrival to the printing cylinder.

These types of register control systems are configured to detect and apply a displacement correction to each sheet. In order to make displacement corrections to each sheet, the conveying system in the converting machine constantly needs to change the speed of vacuum transfer units and often needs to make large accelerations of decelerations. This has a negative impact on the wear on drive mechanisms such as belts and rollers in the vacuum transfer units.

SUMMARY OF THE INVENTION

In view of the above-mentioned problems, it is an object of the present invention to provide a register control system which limits wear on the converting machine. The object of the invention is solved by a method as defined in claim 1 and a converting machine as defined in claim 13.

According to a first aspect, there is provided a method of aligning a plurality of printed motifs on a sheet in a converting machine, the converting machine comprising a flexographic printing module having at least a first printing unit configured to print a first motif and a second printing unit configured to print a second motif, the first and second flexographic printing units being arranged in succession along a direction of transportation of the sheet, the converting machine further comprising a register correction system having a first sensor arranged in a first detection position at a distance upstream of the first printing unit and a second sensor arranged in a second detection position at a distance upstream of the second printing unit, the method comprising the steps of:

- Detecting a passage of a front leading edge of the sheet with the first sensor,
- Determining an actual position of the front leading edge (5) at the first detection position from a detection time of the first sensor,
- Defining the actual position as an initial reference position for the sheet,
- Calculating a second reference position at a downstream-located second sensor position by adding to the initial reference position, a predetermined distance between the first and second detection positions,
- Detecting a passage of the front leading edge with the second sensor and determining an actual position of the front leading edge at the second sensor position from a detection time provided by the second sensor,
- Calculating an individual displacement error at the second detection position by determining a difference between the detected actual position and the second reference position,
- Comparing the individual displacement error to a first threshold,
- If the individual displacement error is lower than the first threshold, then providing an angular position correction to a printing cylinder in the second flexographic printing unit,
- If the error is higher than the first threshold, then providing a first correction in the form of an angular position correction to the printing cylinder and a second correction to change the position of the sheet, said second correction is performed by modifying the transportation speed of a vacuum transfer unit located between the second sensor position and the second printing unit, and whereby the sum of the first and second corrections equal the individual displacement error.

The present invention is based on a realization that a correction can be distributed on the printing cylinder and the vacuum transfers. Consequently, this reduces the correction needed for the vacuum transfers.

The second reference position is preferably calculated by adding to the initial reference position, a predetermined distance between the first and second detection positions.

The rotary displacement correction aligns to the printing cylinder to the position of the sheet.

If the displacement error is lower than the first threshold, the angular position correction corresponds to the displacement error. Hence, the error is only corrected with an angular correction of the printing cylinder.

In an embodiment, the angular position correction corresponds to wherein the angular position correction corresponds to a fixed angular length limit of the printing cylinder and wherein the remaining part of the displacement error is corrected by a change in speed in the vacuum transfer unit.

The change of speed is provided as an acceleration or deceleration of the transportation speed in the vacuum transfer unit.

The fixed angular length limit may be a constant correction which is applied for each sheet with a displacement error exceeding the first threshold.

The angular length limit of the printing cylinder can be between 0.5 mm to 1.5 mm, preferably about 1 mm. The angular length limit is thus a segment length on the circumference of the printing cylinder. The angular length limit can also be defined as the arc length of the printing cylinder corresponding to the angular correction.

In an embodiment, the converting machine comprises at least four flexographic printing units and wherein a sensor and a vacuum transfer unit are arranged upstream of each flexographic printing unit.

In an embodiment, each sensor located downstream of the first sensor is configured to detect the passage of the front leading edge of the sheet and wherein a control unit of the register control system is configured to determine the actual position of the front leading edge at each sensor location and provide an angular position correction to each downstream-located printing cylinder and change the speed of each vacuum transfer unit located downstream of each sensor to correct the position of the sheet in the direction of transportation.

In an advantageous embodiment, the method further comprises the steps of:

- Detecting a passage of the front leading edge of the sheet at a sensor located at a position downstream of the first sensor,
- Comparing the detected position of the front leading edge of the sheet to a reference position and defining the difference therebetween as a tendency displacement error,
- Comparing the tendency displacement error to a second threshold,
- Applying a tendency speed correction to each controllable vacuum transfer unit located downstream of the second sensor in the flexographic printing module if the displacement error exceeds the second threshold.

It has also been found that the individual displacement errors have commonalities in relation to the sheet qualities. By analyzing those types of commonalities, some displacements can be predicted and accommodated for by a tendency analysis and correction. In an embodiment, the tendency displacement error may be determined at a sensor location between a third and fourth flexographic printing units.

The method may further comprise the step of confirming the displacement error before applying the tendency correction, the step of confirming the displacement error is effectuated by calculating an average displacement error for a number of sheets in a sample. The sample may for instance contain between 5 and 10 sheets.

The tendency calculation and correction are preferably repeated after each sample.

In an embodiment, the acceleration and deceleration of the vacuum transfers are adjusted in relation to the sheet transportation speed. Preferably, the acceleration and deceleration are performed over the full distance between the sensor position and the printing cylinder.

The invention also relates to a converting machine comprising a register correction system being configured to perform at least partially the method of aligning a plurality of printed motifs on the sheet according to the first aspect and wherein the converting machine comprises:

- a flexographic printing module having at least a first printing unit configured to print a first motif on a sheet and a second printing unit configured to print a second motif on the sheet, the first and second flexographic printing units being arranged in succession along a direction of transportation of the sheet, and
- a register correction system, the register correction system comprising a first sensor arranged in a position at a distance upstream of the first flexographic printing unit and a second sensor arranged in a position at a distance upstream of the second flexographic printing unit.

BRIEF DESCRIPTION OF THE DRAWINGS

The invention will now be described by way of example and with reference to embodiments shown in the enclosed drawings, where the same reference numerals will be used for similar elements and in which.

DETAILED DESCRIPTION

Figure 1A:
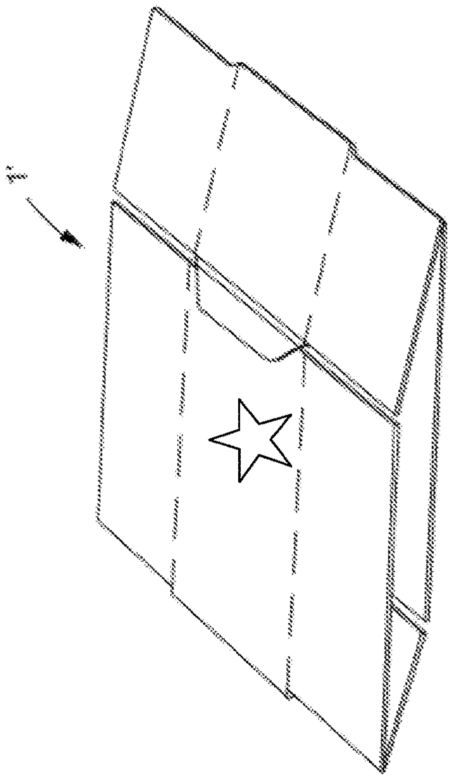
FIGS. 1*a*, 1*b* and 1*c* show examples of a folding box and a flat-packed box obtainable from converting machines.
Figure 1B:
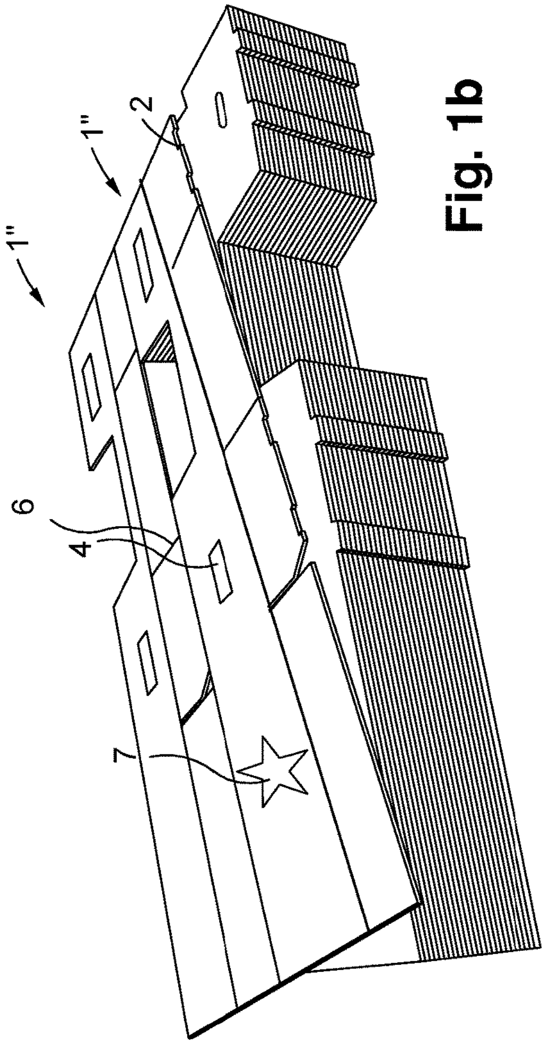
Figure 1C:
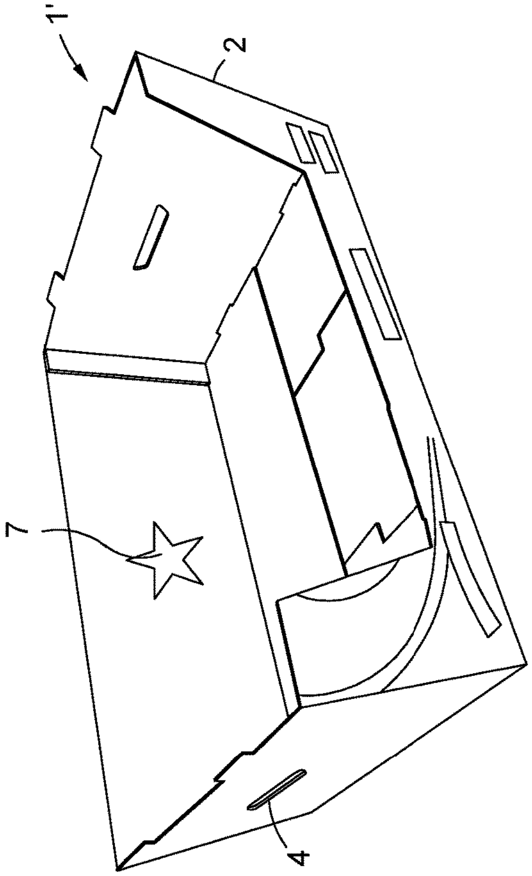

Now referring to FIGS. 1*a* and 1*b*, which illustrate examples of a folding box 1' and a flat-packed box 1". The folding box 1' can for instance be obtained from a flexo-folder-gluer machine and the flat-packed box can be obtained from a rotary die-cutter machine. Commonly for both types of converting machines, a sheet substrate in the form of a square or rectangular corrugated cardboard or paperboard is placed in a feeder of the converting machine. The folding boxes 1' or the flat-packed boxes 1" are typically provided with a printed motif 7 on at least one of the inside and outside surfaces.

As seen in FIG. 1*b*, the flat-packed box 1" is provided in a sheet-form and comprises a shaped periphery 2, cut-outs 4 for e.g. handles and crease lines 6 which enable folding.

Figure 2:
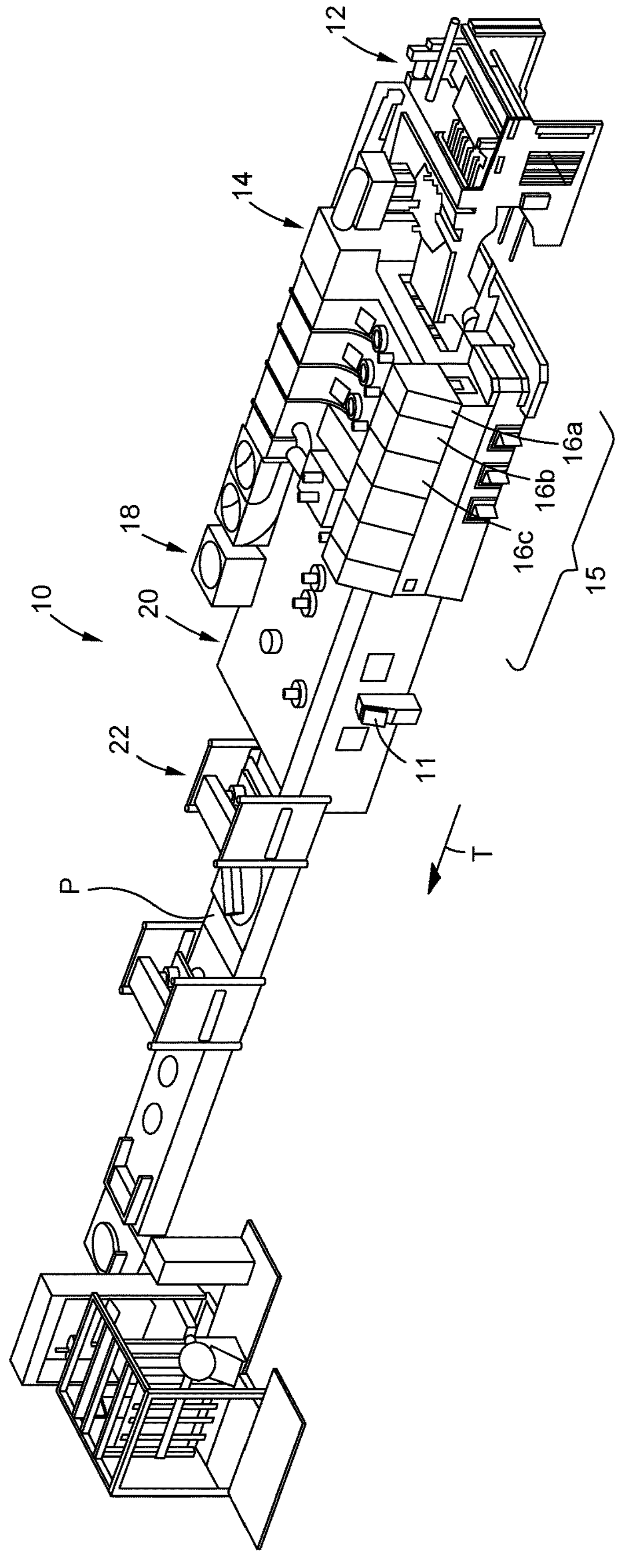
FIG. 2 is a schematic perspective view of a converting machine in the form of a rotary die-cutter and as known in the prior art.

A converting machine 10 in the form of a rotary die-cutter is illustrated in FIG. 2 and comprises a plurality of different modules. From the inlet of the converting machine 10 and in a downstream direction along a direction of transportation T, the converting machine 10 may comprise a prefeeder module 12, a feeder module 14, a printing module 15, a die-cutting module 18, a stacker module 20 and a palletizer-breaker 22. A main operator interface 11 may also be provided in the proximity of the converting machine 10. The converting machine 10 may also comprise an ejector module located downstream of the printing module 15 or downstream of the die-cutting module 18.

Figure 3:
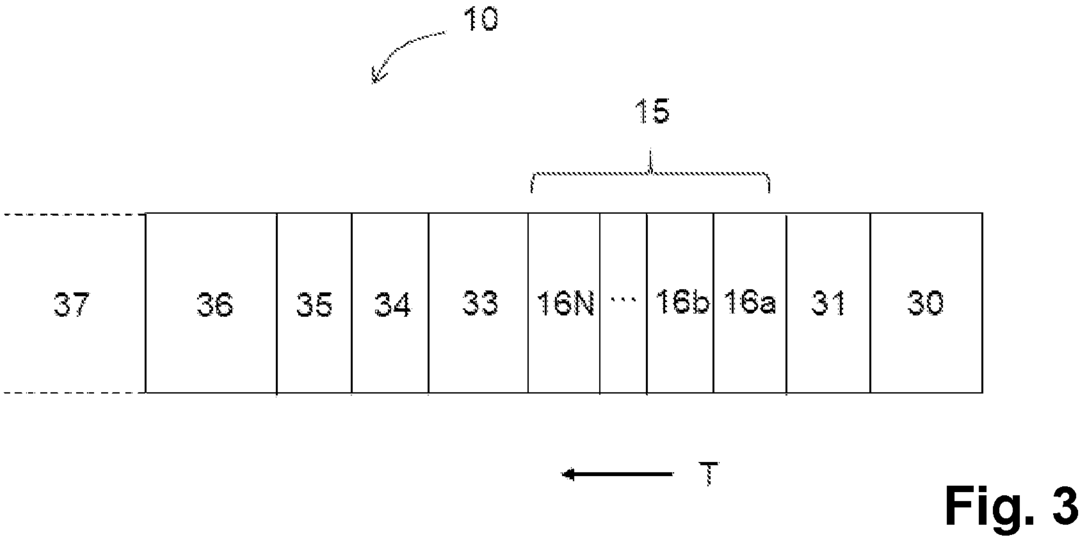
FIG. 3 is a schematic diagram of a converting machine in the form of a flexo-folder-gluer and as known in the prior art.

A flexo-folder-gluer machine 10 is schematically illustrated in FIG. 3 and comprises successively from upstream to downstream in a direction of transportation T a loader 30 for automatically loading the sheet substrates 3, a feeder 31, a flexographic printing module 15 with a plurality of flexography printing units 16*a* to 16N, at least one slotter assembly 33 and at least one cutting unit 34, a waste-stripping unit and an optional vibrating unit 35, and a folding-gluing unit 36. The flexo-folder-gluer machine 10 may also further comprise optional modules 37 such as a counting-ejecting unit, a bundler and a palletizer (partially represented with dotted lines in FIG. 3).

The flexographic printing modules 15 of the rotary die-cutter and the flexo-folder-gluer machines 10 can be configured in a similar manner and comprise a plurality of flexographic printing units 16. Depending on the number of colors needed, the converting machine 10 is provided with a corresponding number or flexographic printing units 16. For instance, four flexographic printing modules 16*a* to 16*d* may be provided, which may enable printing with CMYK color codes. Each flexographic printing unit 16 comprises a flexographic printing assembly 40.

Figure 4:
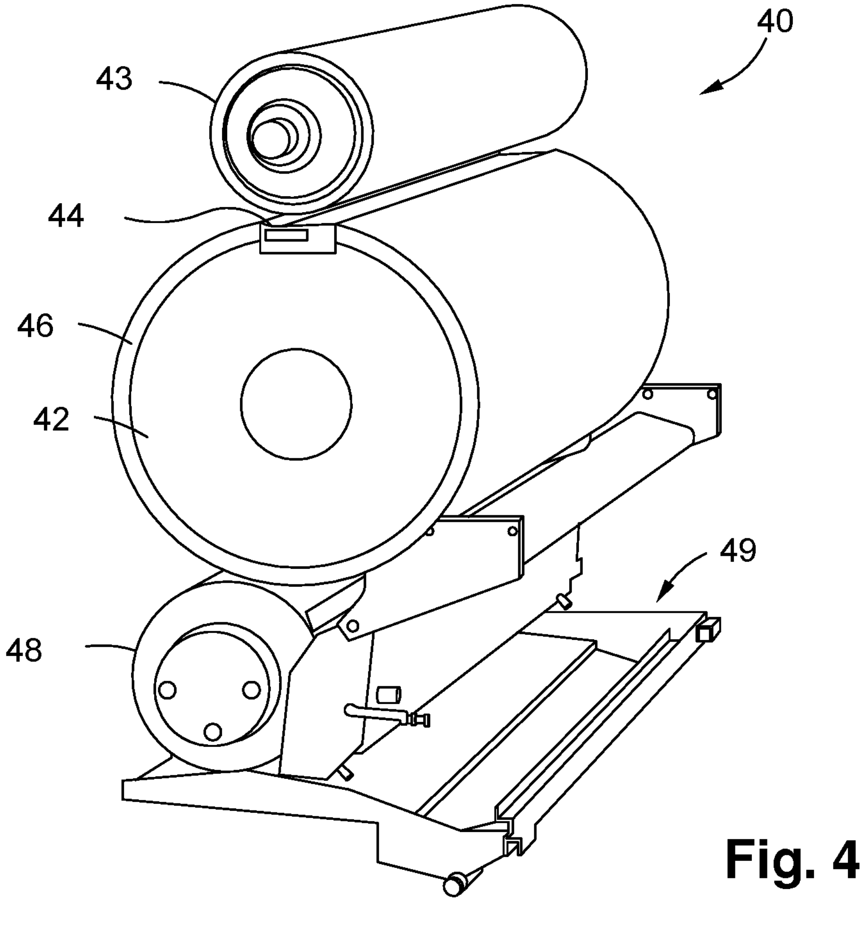
FIG. 4 is a schematic perspective view of a flexographic printing assembly of a flexographic printing unit.

A composition of a flexographic printing assembly 40 is illustrated in FIG. 4. The flexographic printing assembly 40 comprises a printing cylinder 42 provided with an attachment bracket 44 onto which a printing plate 46 can be mounted, and an anvil 43. The printing plate 46 is provided with a printing die for printing a specific motif 7 on the sheet 3. An anilox cylinder 48 is arranged in the proximity of the printing cylinder 42 and is configured to absorb and transfer ink from a liquid supply device, such as a doctor blade chamber 49, to the printing plate 46.

Figure 5:
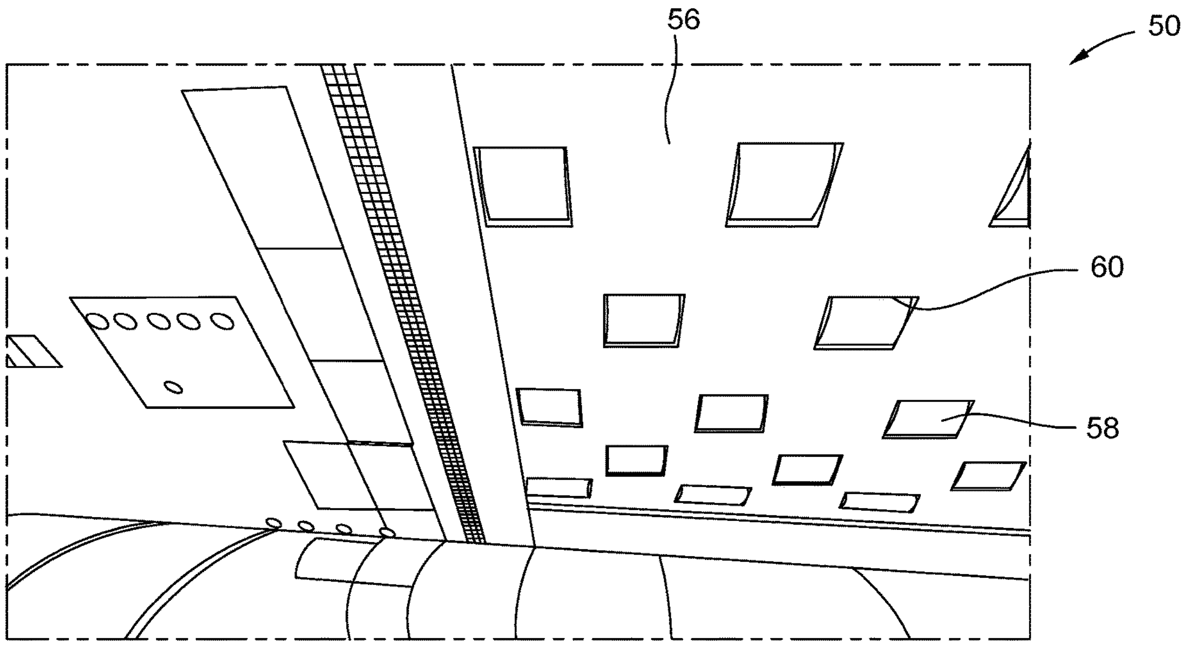
FIG. 5 is a schematic view of vacuum transfer unit of a converting machine.
Figure 6:
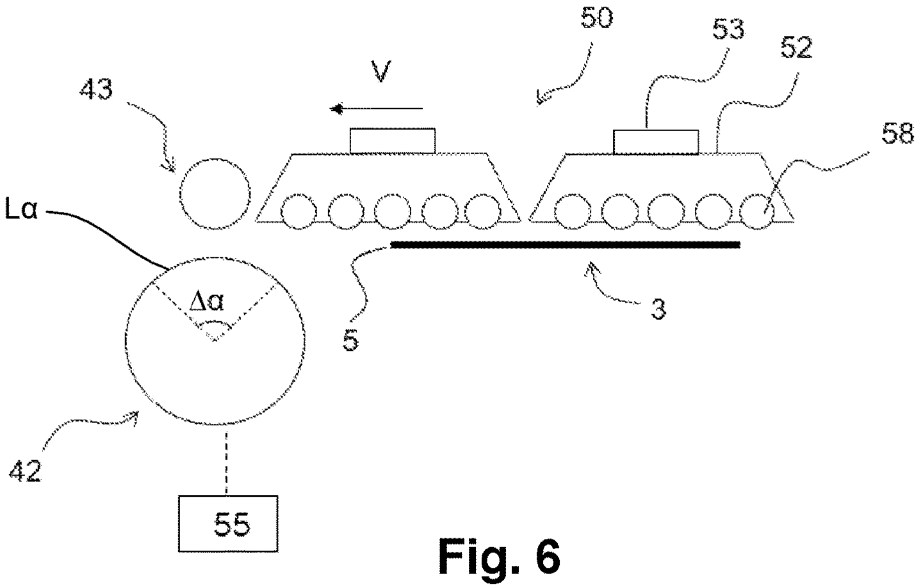
FIG. 6 is a schematic diagram of the sheet transportation at the vacuum transfer unit and the flexographic printing assembly.

As best seen in FIGS. 5 and 6, the converting machine 10 further comprises a conveying system 50 configured to transport the sheet 3 through the converting machine 10 in the direction of transportation T. The direction of transportation T is defined from the inlet to the outlet of the converting machine 10. The conveying system 50 may comprise a plurality of separate transportation segments 52, referred to as transfers units 52. In particular, the conveying system 50 may comprise a series of transfer units 52 in the configuration of vacuum transfers 52.

The vacuum transfers 52 comprise a transportation surface 56 and drive elements 58 such as endless belt conveyors and rollers 58 to convey the sheet 3 through the converting machine 10. Vacuum apertures 60 are arranged around the rollers 58 to ensure that the sheet 3 is adhered against the rollers 58. The transportation speed V of the sheet 3 corresponds to the tangential speed of the printing cylinder 42, which typically also corresponds to the transportation speed provided by the vacuum transfers 52.

At the start-up or installation of the converting machine 10, predetermined register settings of the converting machine 10 can be calibrated in a teaching cycle. The calibration defines the angular positions of the flexographic printing cylinders in relation to the position of a front leading edge 5 of a sheet 3. This is referred to as the calibrated printing register settings of the converting machine 10.

Figure 7:
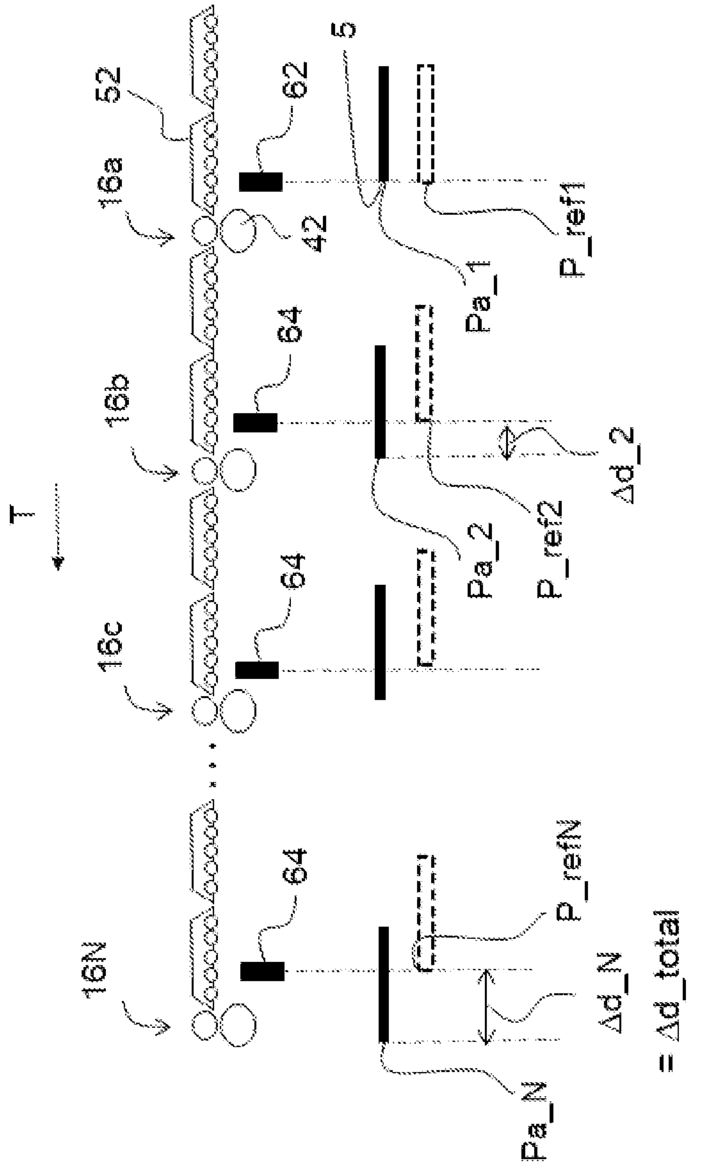
FIG. 7 is a schematic diagram showing sheet displacement errors in a flexographic printing module.

As best seen in FIG. 7, each individual sheet 3 is typically subject to individual displacement distances Δd as the sheet 3 is conveyed by the conveying system 50 along the direction of transportation T from the first flexographic printing unit 16*a* and through the flexographic printing module 15. The individual displacement distances are thus individual displacement errors Δd, which result in that the sheets 3 do not arrive perfectly according to the calibrated printing register positions at each printing cylinder 42. The individual displacement errors Δd may also in the context of this application be interchangeably referred to as "longitudinal individual displacement errors Δd". The individual displacement errors Δd are determined in the direction of transportation T.

These individual displacements errors Δd will result in a misalignment of the different colors in the motifs printed from the different flexographic printing units 16*a* to 16N. The same sheet 3 can arrive too early in relation to the angular position of one printing cylinder 42, while arriving too late to another printing cylinder 42.

Figure 8:
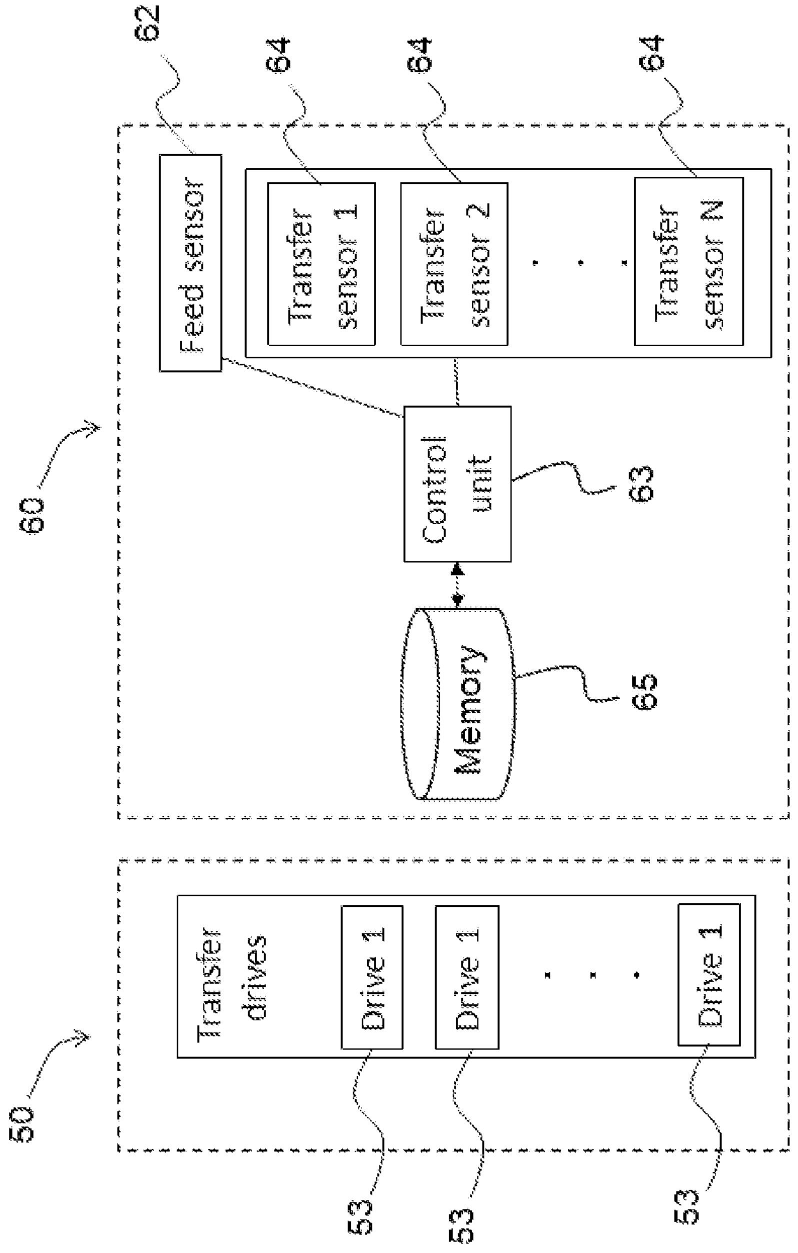
FIG. 8 is a schematic diagram of a register control system according to an embodiment of the present invention.
Figure 9:
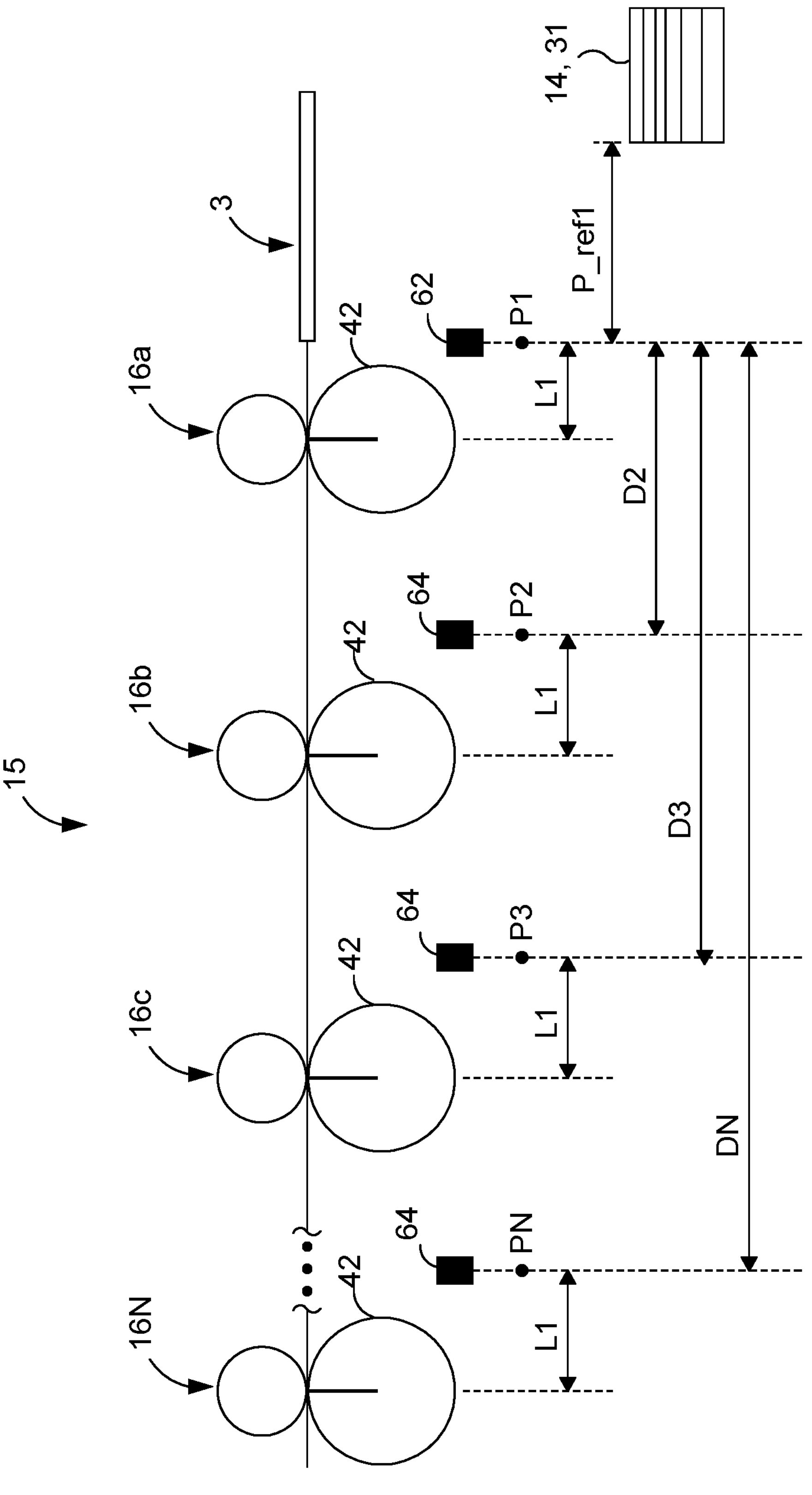
FIG. 9 is a schematic cross-sectional diagram of a register control system in a flexographic printing module according to an embodiment of the present invention.

As illustrated in FIGS. 8 and 9, the conveying system 50 is connected to a register control system 60, which is configured to detect and calculate the individual displacement errors Δd at a plurality of detection positions P1 to PN (may also be referred to as "sensor locations") along the direction of transportation T of the sheet 3 through the flexographic printing module 15. The register control system 60 is further configured to correct the position of the sheet 3.

The register control system 60 comprises a control unit 63, a memory 65, and a plurality of sensors 62, 64. The control unit 63 can be a central control unit. Alternatively, there is a plurality of control units 63 and each sensor 62, 64 is connected to its dedicated control unit 63 to enable simultaneous calculations.

As best seen in FIG. 9, the sensors 62, 64 are arranged at predetermined longitudinal positions P1 to PN along the direction of transportation T of the sheet 3. Each sensor 64 is located at a predetermined distance D2 to DN from the position P1 of a first sensor 62. The first sensor 62 can be a feed sensor 62. The first sensor 62 is located at a distance L1 upstream of the flexographic printing cylinder 42 of the first flexographic printing unit 16*a*. A plurality of sensors 64 are located downstream of the first feed sensor 62 and may also be positioned at a distance L1 upstream of the second and subsequent flexographic printing cylinders 42. The sensors 64 are preferably configured as transfer sensors 64.

The distance L1 typically corresponds to the time required for the control unit 63 to determine the individual displacement error Δd. The distance L1 also provides a sufficiently large travel distance in the vacuum transfer 52 located between the sensor 64 and the downstream-located flexographic printing arrangement 16 to make it possible to correct the position of the sheet 3 or effectuate an angular position correction Δα of the printing cylinder 42 before the sheet 3 arrives to the printing cylinder 42. In an embodiment, the distance L1 between the sensor and the printing cylinder 42 is in the range of 200 to 600 mm, preferably about 400 mm.

As illustrated in FIG. 7, the sensors 62, 64 are configured to detect the passage of a front leading edge 5 of each sheet 3. The sensors 62, 64 can be in the form of optical detectors and are distributed along the direction of transportation T of the sheet 3. The sensors 62, 64 can be laser detectors with background suppression or other types of optical sensors configured to detect the passage of the front leading edge 5.

The speed and acceleration of the vacuum transfers 52 can be controlled and changed by the register control system 60 such that the position of the sheet 3 is adjusted before it arrives at a downstream-located printing cylinder 42. As illustrated in FIG. 6, the register control system 60 can also be configured to provide an angular position correction Δα to the printing cylinders 42 in order to control the position in which the motif 7 is transferred onto the sheet 3.

As best seen in FIGS. 7 and 9, the plurality of transfer sensors 64 are located at predetermined longitudinal positions P2 to PN from the feed sensor 62.

An initial displacement of the sheet 3 often occurs in the feeder 14, 31, as the sheet 3 may be too much advanced or too little advanced in relation to a feeder discharge signal given by a central control system of the converting machine 10.

The actual position Pa_1 of the front leading edge 5 of each sheet 3 at the first sensor 62 can be set as an initial reference position P_ref1 of the sheet 3 for the further downstream-located flexographic printing units 16*b* to 16N. This means that no correction of the position of the sheet 3 or any angular position correction Δα of the printing cylinder 42 is effectuated inside or before the first flexographic printing unit 16*a*. The initial reference position P_ref1 is defined as a position at a specific moment in time. The predetermined moment in time may be in relation to a feeder discharge signal. The initial reference position P_ref1 is different for each sheet 3 coming from the feeder 14, 31 and will be determined for each sheet 3.

The central control system of the converting machine 10 is configured to determine the actual positions Pa_1 to Pa_N of the front leading edge 5 of the sheet 3 from the detection time of the sensors 62, 64. The actual positions Pa_1 to Pa_N are determined at each respective sensor location P1 to PN. A calculation to determine the actual positions is carried out by a central control unit and a general counter of the converting machine 10 by comparing captured data from the sensors 62, 64 to calibrated master settings and machine sensor inputs (i.e. sensors indicating the relative positions of machine parts).

Alternatively, the actual position Pa_1 at the feed sensor 62 can be calculated by the product from the transportation speed V and the detection time at the feed sensor 62. Similarly, an actual position Pa_2 at the second sensor 64 can be calculated by the control unit 63 by retrieving the transportation speed V of the sheet 3 and multiplying with the elapsed time of detection at the second sensor 64. The time of detection starts counting when the general counter issues a discharge signal.

In order to align the printed motifs from the different flexographic printing units 16*b* to 16N located further downstream of the first flexographic printing unit 16*a*, the actual positions Pa_2 to Pa_N of the front leading edge 5 of each individual sheet 3 are detected with each sensor 64 located upstream of each flexographic printing unit 16*b* to 16N.

As illustrated in FIG. 7, the actual positions Pa_2 to Pa_N of each sheet 3 at each sensor position are detected and compared to corresponding calculated reference positions P_ref2 to P_refN for each specific sensor location P2 to PN.

The reference position P_ref2 at the second sensor position P2 can be calculated by adding a predetermined distance D2 (see FIG. 9) between the first sensor position P1 and the second sensor position P2 to the initial reference position P_ref1.

The reference positions P_ref2 to P_refN of the front leading edge 5 of the sheet 3 downstream of the first sensor position P1 can all be calculated in the same way; by adding the distances D2 to DN from each respective sensor position P2 to PN to the initial reference position P_ref1. The actual positions Pa_1 to Pa_N and the reference positions P_ref1 to P_refN are defined by a longitudinal coordinate in the direction of transportation T. The control unit 63 determines an individual displacement error Δd for each sheet 3 at each sensor position P2 to PN downstream of the feed sensor 62.

As best seen in FIGS. 7 and 9, the individual displacement error Δd is thus the difference in longitudinal distance (in the direction of transportation T) between the detected actual position Pa and the reference position P_ref at each sensor position. The individual displacement error at each respective transfer sensor position P2 to PN can be referred to as Δd2 to ΔdN.

The resulting displacement error Δd can be calculated from the actual position subtracted by the reference position. Hence the following relationships apply:

$$\Delta d = \mathrm{Pa} - \mathrm{P\_ref}$$

At the second sensor position, the displacement error equals:

$$\Delta \mathrm{d\_2} = \mathrm{Pa\_2} - \mathrm{P\_ref2}$$

The reference position P_ref2 at the second sensor position P2 is dependent on the first reference position P_ref1; and the distance between the first sensor position P1 and the second sensor position P2 is fixed. Consequently, the following relationship apply:

$$\Delta \mathrm{d\_2} = \mathrm{Pa\_2} - D2 - \mathrm{P\_ref1}$$

$$\ldots$$

$$\Delta \mathrm{d\_N} = \mathrm{Pa\_N} - DN - \mathrm{P\_ref1}$$

The individual displacement errors Δd are corrected by the register control system 60. The individual displacement errors Δd at each sensor position P2 to PN following the first flexographic printing unit 16*a* are compared to a first threshold T1.

If the individual displacement error Δd is below the first threshold T1, a correction is only effectuated by an angular position correction Δα on the of the closest downstream-located printing cylinder 42. Thus, the register control system 60 provides a rotary displacement correction to the printing cylinder 42 such that the printing plate 46 is aligned to the actual position Pa of the sheet 3. The first threshold T1 can be between 0.5 to 1.5 mm, preferably about 1 mm. This means that an angular segment length of the printing cylinder 42 can be corrected up to an angular length limit La. The angular length limit La can be between 0.5 mm to 1.5 mm, preferably about 1 mm.

The angular position of the printing cylinder 42 can be modified by a motorized system 55 of the converting machine 10. The motorized system 55 may receive the required angular position correction Δα from the register control system 60.

It can be difficult to manage large angular position corrections Δα on a heavy printing cylinder 42 due to its inertia. However, for small individual displacement errors Δd, the angular position adjustment of the printing cylinder 42 is a stable and durable way to correct. This avoids the previously mentioned problem of excessive use of the vacuum transfers and oscillation of the belts in the vacuum transfers.

However, if the individual displacement errors Δd are larger than the first threshold T1, the correction is effectuated by a combination of an angular position correction Δα of the printing cylinder 42 and a speed correction Δv in the form of a change of speed in the vacuum transfer 52 located between the transfer sensor 64 and the closest downstream located printing cylinder 42. This is illustrated in FIGS. 10*a* and 10*b*.

Hence, if the resulting individual displacement error Δd is larger than the angular length limit La, the correction is applied on both the vacuum transfer 52 and the printing cylinder 42. The register correction system 60 is thus configured to provide a first correction c1 in the form of an angular position correction Δα to the printing cylinder 42. Additionally, a second correction c2 is performed by modifying the transportation speed V of a vacuum transfer unit 52 located between a transfer sensor position P2 to PN and the closest downstream located printing cylinder 42. The change of speed V allows to modify the position of the sheet 3 in the direction of transportation T.

The sum of the first correction c1 and the second correction c2 equal the longitudinal displacement error Δd_2. The first correction c1 preferably corresponds to the angular length limit Lα, and the second correction c2 corresponds to the total displacement error Δd subtracted by the angular length limit Lα.

Figure 10B:
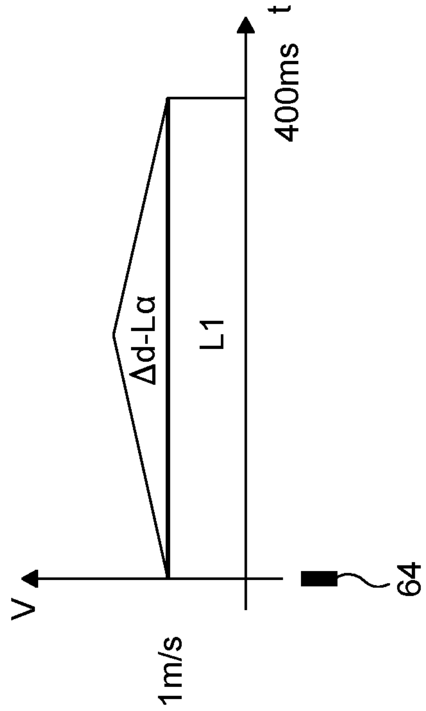
FIGS. 10*a* and 10*b* are schematic graphs showing acceleration and deceleration profiles according to embodiments of the present invention.
Figure 10A:
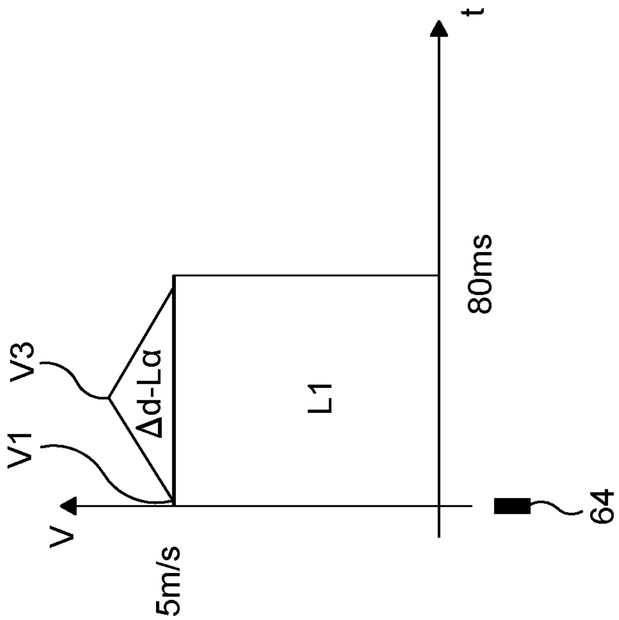

This is schematically illustrated in FIGS. 10*a* and 10*b* and will be further described later on in more detail. FIGS. 10*a* and 10*b* illustrate the situation when the front leading edge 5 of the sheet 3 is not enough advanced in the direction of transportation T. In other words, this means that the sheet 3 without correction would arrive too late to the printing cylinder 42. As seen in FIGS. 10*a* and 10*b*, the sheet 3 has an initial speed V1 as it arrives to the sensor 64. After the sensor 64, the sheet 3 is accelerated to a second speed V3 and then decelerated again to return to the initial speed V1. The initial speed V1 can be defined as the standard operating speed.

However, in the case where the sheet 3 is too much advanced in the direction of transportation. In other words, when the sheet 3 without correction would arrive too early to the printing cylinder 42, there is first a deceleration of the initial speed V1 to reach the second speed V3 based on input from the sensor 64 and then an acceleration to return to the initial speed V1.

This correction of each individual sheet 3 in or before each flexographic printing unit 16*b* to 16N is referred to as individual sheet correction.

The detected individual displacement errors Δd are preferably corrected before the sheet 3 arrives at the closest subsequent printing cylinder 42. However, for large displacement distances, such as more than 2 mm, it might not be possible for the vacuum transfers 52 and printing cylinders 42 to correct the full individual displacement error Δd between the sensor 64 and the closest downstream-located printing cylinder 42. In such a case, the sheet 3 can be tagged and tracked by the register control system 60 for ejection in an ejection module. Optionally, a third tolerance threshold T3 can be provided and the sheet 3 can be tagged for ejection only if the third tolerance threshold T3 is exceeded. The third tolerance threshold T3 can thus be dependent on the quality requirements for the finished folding boxes 1' or flat-packed boxes 1".

There are variations in the material characteristics between different piles of sheets 3 placed in the feeder 14, 31 of the converting machine 10. The variations are related to the sheet quality, such as the presence of warps, uneven surfaces and variations in permeability and rigidity. The reason can be that some piles of sheets 3 have been produced in different batches and at different times in a corrugator machine.

The individual displacement error Δd of the of sheets 3 may vary at different sensor positions P2 to PN. However, as illustrated in FIG. 7, a consistent total displacement error Δd_total can be determined at the end of the flexographic printing module 15 in the last sensor position PN. Hence, the total displacement error Δd_total corresponds to the displacement error Δd_N at the printing unit number N. A consistent displacement error means that the total displacement error Δd_total at the end of the flexographic printing module 15 among a plurality of sheets 3 show less variations than the individual displacement errors in each flexographic printing unit 16*a* to 16N and for each sheet 3.

It has been found advantageous to determine an average tendency error Δd_total_avg by analyzing a sample S of sheets 3 from a pile placed in the feeder 14, 31. The sample S includes a plurality of sheets 3 from the same pile, for instance between 5 to 10 sheets. In order to calculate the average tendency error Δd_total_avg, the sample S of sheets 3 are conveyed through the converting machine 10 and a total displacement error Δd_total for each sheet 3 is calculated at the last sensor position PN at the end of the flexographic printing module 15 by determining the total displacement error Δd_total of the front leading edge 5 of the sheet 3 at the last sensor position PN in relation to the reference position P_refN. Hence the tendency displacement error for each sheet can be calculated as:

$$\Delta d\_total = Pa\_N - DN - P\_ref1$$

The control unit 63 is then configured to calculate an average displacement error Δd_total_avg for the sheet sample S, hence:

$$\Delta d\_total\_avg = \frac{\sum \Delta d\_total}{s}$$

Where

ΣΔd_total_avg is the sum of the average displacement error for all sheets in the sample S, and s is the number of sheets in the sample Alternatively, a tendency variation can be determined at a sensor position located downstream of the second sensor position P2. In an embodiment, the average tendency displacement error Δd_total_avg can be detected at a fourth flexographic printing unit 16*d* in relation to the initial reference position P_ref1. Hence, at the fourth sensor location P4. In a fourth flexographic printing unit 16*d*, it has been found that the tendency variation can be calculated with sufficient accuracy.

A tendency correction in the form of a change in speed, i.e. a tendency speed correction Δvt is applied to a plurality of vacuum transfers 52 such that the initial speed V1 of the vacuum transfers 52 is changed. Preferably, all vacuum transfers 52 in the flexographic printing module 15 are provided with a change in speed Δvt. Preferably, each of the vacuum transfers 52 is provided with an equal speed correction Δvt.

Hence, either of the following formulas can be used to determine the new transportation speed:

$$\text{New speed } V2 = V1 * \frac{D_{total} + \Delta d_{total}}{D_{total}}$$

$$\text{New speed } V2 = V1 * \frac{D_{total} + \Delta d_{total\_avg}}{D_{total}}$$

The tendency correction is then calculated as a speed correction Δvt=V2−V1

Where:

Δd_total=tendency displacement error

Δd_total_avg=average tendency displacement error

V1=initial operating speed

V2=new operating speed

D_total=Distance between sensor position (i.e. between sensor positions P2 and PN)

In order to initiate the tendency speed correction Δvt, a second error threshold T2 can be applied to initiate the tendency correction. The register control system 60 can be configured to continuously analyze a sample of sheets 3 and initiate a new tendency correction once a new average tendency error Δd_total_avg has been confirmed from the predefined sample S of sheets 3. The new average tendency error Δd_total_avg and tendency correction can thus be different from a previous tendency correction. This is advantageously carried out continuously during operation of the machine (i.e. during production of the boxes).

For instance, the threshold T2 may be defined by an average tendency error Δd_total_avg of 0.5 mm on a sample of successive sheets 3. The threshold T2 can initiate or re-initiate the tendency correction. The tendency correction is thus only initiated or re-assessed for sufficiently large displacement errors Δd_total_avg exceeding the second threshold T2.

The tendency correction reduces the individual displacement errors Δd of the sheets 3, as the tendency correction is effectuated before the individual sheet correction. This tendency correction limits large corrections in terms of excessive acceleration/deceleration of the vacuum transfers 52.

The tendency correction and the individual sheet correction are preferably effectuated at the same time. This means that despite the tendency correction, each individual sheet 3 is still being controlled and corrected individually. However, the individual sheet correction is reduced because part of the individual displacement error Δd will be anticipated and corrected for by the tendency correction. Optionally, the individual sheet correction is always enabled, while tendency correction can be disabled.

Referring to FIGS. 10*a* and 10*b*, the acceleration and deceleration of the vacuum transfers 52 can be adjusted in relation to the transportation speed V of the sheet 3. At low speed, a large acceleration or deceleration of the vacuum transfers 52 may create oscillations on the driving belts which is driving the rollers 58 such as to destabilize the sheet transportation. To resolve this problem, it has been found that the acceleration and deceleration can be adapted in function of the transportation speed V of the sheets 3. For instance, at high speed, the acceleration and deceleration are higher than at low speed.

The transportation speed V in the vacuum transfer 52 can be varied, whereas a high speed may be up to 5 m/s and a low speed can be around 1 m/s. The second correction c2 of the displacement error Δd which is provided by the vacuum transfer 52 corresponds to Δd-Lα. The correction distance L1 which may be around 400 mm represents the distance where the remaining displacement error Δd-Lα should be corrected by the vacuum transfer 52. At lower speeds, there is thus more time to effectuate an acceleration and deceleration to correct the displacement error.

The acceleration profile is thus selected such as to be symmetrical over the distance L1, such the sheet 3 is accelerated over half the distance of L1 and decelerated over the remaining half distance of L1. This results in that the acceleration is always kept to a minimum and the tension and wear in the drive belts of the vacuum transfers 52 can be further reduced.

The invention claimed is:

1. A method of aligning a plurality of printed motifs on a sheet in a converting machine, the converting machine comprising a flexographic printing module having at least a first printing unit configured to print a first motif and a second printing unit configured to print a second motif, the first and second flexographic printing units being arranged in succession along a direction of transportation of the sheet, the converting machine further comprising a register correction system having a first sensor arranged in a first detection position at a distance upstream of the first printing unit and a second sensor arranged in a second detection position at a distance upstream of the second printing unit, the method comprising:

detecting a passage of a front leading edge of the sheet with the first sensor, determining an actual position of the front leading edge at the first detection position from a detection time of the first sensor, defining the actual position as an initial reference position for the sheet, calculating a second reference position at a downstream-located second sensor position, detecting a passage of the front leading edge with the second sensor and determining an actual position of the front leading edge at the second sensor position from a detection time provided by the second sensor, calculating an individual displacement error at the second detection position by determining a difference between the detected actual position and the second reference position, comparing the individual displacement error to a first threshold, if the individual displacement error is lower than the first threshold, then providing an angular position correction to a printing cylinder in the second flexographic printing unit, and if the error is higher than the first threshold, then providing a first correction in the form of an angular position correction to the printing cylinder and a second correction to change the position of the sheet, said second correction is performed by modifying the transportation speed of a vacuum transfer unit located between the second sensor position and the second printing unit, and whereby the sum of the first and second corrections equal the individual displacement error.

2. The method according to claim 1, wherein the angular position correction corresponds to a fixed angular length limit of the printing cylinder and wherein the remaining part of the displacement error is corrected by a change in speed in the vacuum transfer unit, and wherein the change of speed is an acceleration or a deceleration.

3. The method according to claim 2, wherein the angular length limit of the printing cylinder is between 0.5 mm to 1.5 mm, preferably about 1 mm.

4. The method according to claim 1, wherein the converting machine comprises at least four flexographic printing units and wherein a sensor and a vacuum transfer unit are arranged upstream of each flexographic printing unit.

5. The method according to claim 4, wherein each sensor located downstream of the first sensor is configured to detect the passage of the front leading edge of the sheet and wherein a control unit of the register correction system is configured to determine the actual position of the front leading edge at each sensor position and provide an angular position correction to each downstream-located printing cylinder, the control unit being further configured to change the speed of each vacuum transfer unit located downstream of each sensor to correct the position of the sheet in the direction of transportation.

6. The method according to claim 1, further comprising:

detecting a passage of the front leading edge of the sheet at a sensor located at a position downstream of the first sensor, comparing the detected position of the front leading edge of the sheet to a reference position and defining the difference therebetween as a tendency displacement error, comparing the tendency displacement error to a second threshold, and applying a tendency speed correction to each controllable vacuum transfer unit located downstream of the second sensor in the flexographic printing module if the displacement error exceeds the second threshold.

7. The method according to claim 6, wherein the tendency displacement error is determined at a sensor position between a third and a fourth flexographic printing unit.

8. The method according to claim 6, further comprising:

confirming the displacement error before applying the tendency correction, wherein the confirming the displacement error is effectuated by calculating an average displacement error for a number of sheets in a sample.

9. The method according to claim 8, wherein the sample contains between 5 and 10 sheets.

10. The method according to claim 9, wherein the tendency calculation and correction are repeated after each sample.

11. The method according to claim 10, wherein the acceleration and deceleration of the vacuum transfers are adjusted in relation to the sheet transportation speed.

12. The method according to claim 11, wherein the acceleration and deceleration are performed over the full distance between the sensor position and the printing cylinder.

13. A converting machine comprising:

a flexographic printing module having at least a first printing unit configured to print a first motif on a sheet and a second printing unit configured to print a second motif on the sheet, the first and second flexographic printing units being arranged in succession along a direction of transportation of the sheet, and a register correction system, the register correction system comprising a first sensor arranged in a first detection position at a distance upstream of the first flexographic printing unit and a second sensor arranged in a second detection position at a distance upstream of the second flexographic printing unit, the register correction system being configured to perform a method of aligning a plurality of printed motifs on the sheet, the method comprising:

detecting a passage of a front leading edge of the sheet with the first sensor, determining an actual position of the front leading edge at the first detection position from a detection time of the first sensor, defining the actual position as an initial reference position for the sheet, calculating a second reference position at a downstream-located second sensor position, detecting a passage of the front leading edge with the second sensor and determining an actual position of the front leading edge at the second sensor position from a detection time provided by the second sensor, calculating an individual displacement error at the second detection position by determining a difference between the detected actual position and the second reference position, comparing the individual displacement error to a first threshold, if the individual displacement error is lower than the first threshold, then providing an angular position correction to a printing cylinder in the second flexographic printing unit, and if the error is higher than the first threshold, then providing a first correction in the form of an angular position correction to the printing cylinder and a second correction to change the position of the sheet, said second correction is performed by modifying the transportation speed of a vacuum transfer unit located between the second sensor position and the second printing unit, and whereby the sum of the first and second corrections equal the individual displacement error.

* * * * *